(12) United States Patent
Schmitt et al.

(10) Patent No.: US 11,577,310 B2
(45) Date of Patent: *Feb. 14, 2023

(54) SINTERING PRESS WITH AXIALLY CONTROLLED DEFORMATION, AND CORRESPONDING METHOD

(71) Applicant: GKN Sinter Metals Engineering GmbH, Radevormwald (DE)

(72) Inventors: Rainer Schmitt, Wachtberg (DE); Robert Maassen, Witten (DE); Eberhard Ernst, Eichenzell (DE); Hasim Tekines, Wachtberg (DE)

(73) Assignee: GKN Sinter Metals Engineering GmbH, Radevormwald (DE)

( * ) Notice: Subject to any disclaimer, the term of this patent is extended or adjusted under 35 U.S.C. 154(b) by 572 days.

This patent is subject to a terminal disclaimer.

(21) Appl. No.: 15/760,839

(22) PCT Filed: Sep. 16, 2016

(86) PCT No.: PCT/EP2016/071976
§ 371 (c)(1),
(2) Date: Mar. 16, 2018

(87) PCT Pub. No.: WO2017/046333
PCT Pub. Date: Mar. 23, 2017

(65) Prior Publication Data
US 2018/0257137 A1 Sep. 13, 2018

(30) Foreign Application Priority Data
Sep. 18, 2015 (DE) .................. 10 2015 012 004.2

(51) Int. Cl.
*B22F 3/00* (2021.01)
*B22F 3/03* (2006.01)
(Continued)

(52) U.S. Cl.
CPC ............... *B22F 3/003* (2013.01); *B22F 3/03* (2013.01); *B30B 11/005* (2013.01); *B30B 11/02* (2013.01);
(Continued)

(58) Field of Classification Search
CPC ........................... B22F 3/03; B22F 2003/033
See application file for complete search history.

(56) References Cited

U.S. PATENT DOCUMENTS 3,611,498 A * 10/1971 Hedin ................. B30B 11/02
425/78
2009/0257904 A1* 10/2009 Lawcock .................. B22F 3/03
419/66
2017/0087638 A1 3/2017 Schmitt et al.

FOREIGN PATENT DOCUMENTS

DE 102014201966 A1 8/2015
JP 2014001429 A 1/2014
(Continued)

OTHER PUBLICATIONS

USPTO translation of SU-1041209 (Year: 1983).*
(Continued)

*Primary Examiner* — Jophy S. Koshy
*Assistant Examiner* — Joshua S Carpenter
(74) *Attorney, Agent, or Firm* — Quarles & Brady LLP

(57) ABSTRACT

A sintering press includes at least one upper punch and a lower punch, a powder reservoir for filling a female die of the sintering press with at least one powder material that can be sintered, and a female die for producing a green body using the powder material from the powder reservoir. A first punch of the upper punches and/or lower punches has a punch top which is off-center and asymmetric with respect to an axial axis of the sintering press and which can be moved in the female die. The first punch is asymmetric in shape between the punch top and the base, which shape at
(Continued)

Figure 1:
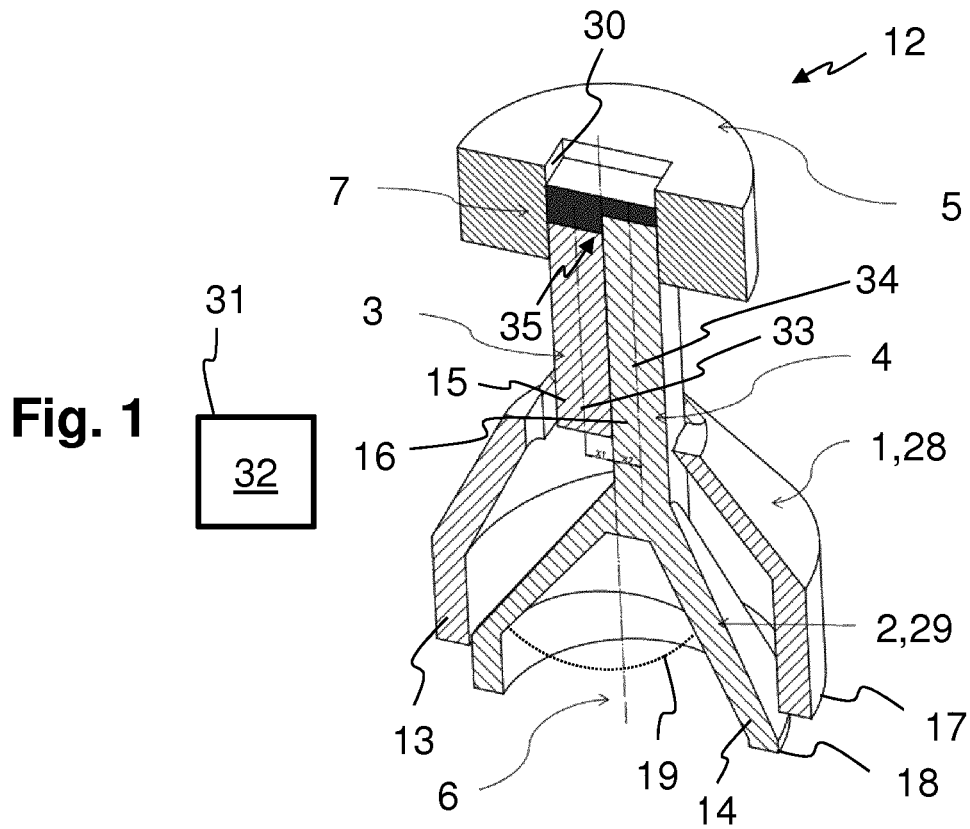

least reduces an axial tilting of the punch and a lateral drag of the punch top on an adjacent outer surface in the female die during insertion and extraction therefrom during a pressing step in the production of the green body.

12 Claims, 3 Drawing Sheets

(51) Int. Cl.
    *B30B 11/02* (2006.01)
    *B30B 15/02* (2006.01)
    *B30B 11/00* (2006.01)
    *B33Y 30/00* (2015.01)

(52) U.S. Cl.
    CPC .......... *B30B 11/027* (2013.01); *B30B 15/026* (2013.01); *B22F 2003/033* (2013.01); *B33Y 30/00* (2014.12)

(56) References Cited

FOREIGN PATENT DOCUMENTS

| JP | 2014100738 A | * | 6/2014 |
|---|---|---|---|
| JP | 2014100738 A | | 6/2014 |
| SU | 1041209 A1 | * | 9/1983 |
| SU | 1041209 A1 | | 9/1983 |
| WO | 2015140228 A1 | | 9/2015 |

OTHER PUBLICATIONS

Merriam-Webster definition of "Strut" <https://www.merriam-webster.com/dictionary/strut> retrieved on Nov. 21, 2020 (Year: 2020).*
Definition of "Eccentric". Merriam-Webster online dictionary. < https://www.merriam-webster.com/dictionary/eccentric > retrieved on Jun. 4, 2021. (Year: 2021).*
Espacenet machine translation of JP 2014-100738 A retrieved on Sep. 21, 2021 (Year: 2014).*
Budman, et al., Calculation of Hydraulic Press cols. Database Compendex [Online] Engineering Information, Inc., 1988, XP002765052, Database Accession No. EIX92090264599, Abstract.
PCT International Search Report and Written Opinion, PCT/EP2016/071976, dated Jan. 2, 2017, 22 pages.

* cited by examiner

SINTERING PRESS WITH AXIALLY CONTROLLED DEFORMATION, AND CORRESPONDING METHOD

This application represents the U.S. national stage entry of International Application No. PCT/EP2016/071976 filed Sep. 16, 2016, which claims priority to German Patent Application No. 10 2015 012 004.2 filed Sep. 18, 2015, the disclosure of which is incorporated herein by reference in its entirety and for all purposes.

The present invention relates to a sintering press, having at least one upper punch and one lower punch, to a calculation method for the design of a pressing tool of a sintering press of said type, to a punch for a sintering press of said type, and to a method for producing a green product using the proposed sintering press.

Sintering presses can be used to produce green products from a powder material, wherein the green products are sintered at a later point in time. Ceramic powder and/or metal powder may be utilized as powder material. Green products are produced in order to manufacture a wide variety of components therefrom. These may be symmetrical, in particular rotationally symmetrical components, or may be asymmetrical components. The latter is however associated with relatively great outlay.

It is an object of the present invention to create a sintering press with punches of long service life with which even relatively complex geometries, in particular asymmetrical geometries, can be produced.

Said object is achieved by means of a sintering press having the features of claim 1, by means of a calculation method having the features of claim 6, by means of a first punch having the features of claim 10, and by means of a method for compressing a sinterable material having the features of claim 11. Further advantageous embodiments and refinements emerge from the subclaims and from the description and the figures. The wording of the respective independent claims represents a first attempt to describe the invention described in more detail below, but without the intention of restricting said invention. Rather, one or more features may be deleted, added or exchanged for one or more features that are described below.

A sintering press having at least one upper punch and one lower punch is proposed, having a powder store for the filling of a die of the sintering press with a sinterable powder material, and having a die for the production of a green product by means of the powder material from the powder store. A first punch, the upper punch and/or lower punch, has a punch head eccentrically and asymmetrically with respect to an axial axis of the sintering press. The punch head is, without a guide, movable within the die along a die outer wall, a mandrel and/or along an adjacent punch in the die. The first punch has, at least in one section between punch head and punch foot, preferably over the entire region between punch head and punch foot, an asymmetrical, in particular rotationally non-symmetrical shape which at least reduces, in particular prevents, radial tilting of the punch and grinding of the punch head along an adjacent outer surface in the die during the movement into and the movement out of said die during a pressing process during the production of the green product.

The asymmetry of the punch head may arise for example from the fact that it is sought to form a green product which is for example not entirely rotationally symmetrical. Accordingly, a region of the punch that is arranged in the die during the pressing process may be arranged eccentrically and also asymmetrically with respect to the axial axis. Also, use may be made of a punch which has multiple regions within the die that are in contact with the powder for compression, wherein the regions differ from one another. Accordingly, different heights, different surface geometries or different shapes may lead to the asymmetry with respect to the axial axis. The following has now been established: as a result of the eccentricity and the asymmetry with respect to the axial axis, a bending moment is generated in the punch when the latter exerts a pressing force on the powder material. The bending moment has had the effect that friction is generated along the punch head with the adjacent die, with a mandrel or with another punch. Friction for example against a mandrel is reduced by virtue of the fact that, now, owing to the asymmetrical design of the geometry of the punch between punch head and punch foot, the punch head has no radially acting tilting tendency. This tilting tendency has, in the past, led to increased wear of such punches with eccentrically arranged punch heads in relation to conventional rotationally symmetrical punches. It has however now been possible to counteract this increased wear by virtue of the punch itself being designed such that the bending moment is supported, in such a way that a bending deformation is reduced or is accommodated in the punch itself at least to such an extent that no or at most only very slight bending deformation occurs. By contrast to the situation in the past, in which it was assumed that adequate bending stiffness of the punch can be realized through high usage of material, a different path has now followed: the geometry of the punch is likewise designed to be asymmetrical in order to thereby counteract the asymmetry of the punch head. This asymmetry may be realized for example by means of material openings in a wall, through the omission of material in a wall, by means of strut arrangements in place of or supporting wall structures, and by means of other measures with the same effect.

For example, it is proposed that, along a cross section of the first punch perpendicular to the movement axis thereof, the asymmetrical shape has an asymmetrical wall, and in particular, the first punch has a different thickness of opposite sides of the wall. Asymmetry in the region between punch head and punch foot is to be understood in particular to mean a deviation from rotational symmetry with respect to the axial axis of the sintering press. The asymmetry may comprise a different design of mutually oppositely situated regions of the shape. Also, use may be made of a different material, an additional material or else an omission of material. For example, an asymmetry may be achieved by means of different wall thicknesses, by means of different designs, by means of openings, by means of strut arrangements, by means of the geometrical design such as for example, conical, bell-shaped or the like. Also, for example, a framework structure may be utilized in order to realize a connection of the punch foot to the punch head. By means of the asymmetry that is realized, bending compensation is preferably realized in the punch itself. In this way, it is for example possible for bending of the punch head or of the punch in one direction to be counteracted.

A shape of the asymmetry is realized for example by means of a combination of an oblique transition, in relation to the axial axis of the sintering press, from a cylindrical ring shape to a conical ring shape if the punch becomes narrower from the punch foot toward the punch head. Here, as in other configurations, the punch foot is arranged symmetrically, preferably rotationally symmetrically, with respect to the axial axis of the sintering press, preferably with, for example, a foot plane which runs perpendicular to the axial axis of the sintering press and which is seated directly on an adapter of the sintering press. A punch of said type thus has a symmetrical punch foot and an asymmetrical punch head, wherein a compensation of bending forces in the punch itself is realized by means of the transition. The transition from the cylinder ring to a preferably conical ring shape via a narrowing oviform or elliptical ring shape, for example, makes it possible for the associated wall to likewise be adapted, in particular designed asymmetrically, such that bending forces and bending moments can be compensated.

A tool having a first punch which has a symmetrical punch foot and an asymmetrical punch head preferably generates a green product which has an overall center of gravity on the axial axis of the sintering press.

One embodiment provides for example that the sintering press has one or more punches which are movable one inside the other. It is preferable for at least some punches, preferably all punches, to have a conical widening. Such presses and also punches are preferably designed in the manner that emerges from the applicant's DE 10 2014 003 726 with the title "Presse zum Herstellen maßhaltiger Grünlinge and Verfahren zum Herstellen" ["Press for producing dimensionally accurate green products, and production method"], which has not yet been published, and the entire content of which is hereby incorporated by reference into the disclosure in this regard. Possibilities for producing punches, for example by means of additive manufacturing methods on their own or in combination with other production methods emerge from DE 10 2015 01784 and DE 10 2015 01785, which have not yet been published. The entire content of said documents is likewise incorporated by reference into the disclosure with regard to the production but also with regard to the design of the punches.

A further embodiment provides for example that the asymmetrical wall is a wall equipped with strut arrangements. It is thus possible, for example, for one region of the wall to be provided with an additional support, in particular as a stiffening. The wall may also be replaced in regions by one or more strut arrangements.

It is preferable for an asymmetrical region between punch head and punch foot to be arranged approximately opposite an asymmetrically projecting end of the punch head. Here, there may also be a height difference along the axial axis of the sintering press for the asymmetrical region, resulting in an obliquely oppositely situated configuration. For example, a transition from one geometrical shape to another geometrical shape runs along the circumference obliquely in relation to the axial axis of the sintering press. Here, it is for example preferable for an adaptation of the geometrical shape to the asymmetrical end of the punch head to be arranged so as to be rotationally offset by approximately 180°. A further embodiment provides for example that an adaptation of the geometrical shape is, as it were, split up. Accordingly, it is possible for multiple reinforcements or weakened portions to be present around the circumference, which make it possible, by means of the geometrical shape thus formed, for bending owing to the acting pressing force to be at least substantially absorbed in the punch.

In the case of a design for compensating, within the punch, an axial force that acts spaced apart from the axial axis of the sintering press and in so doing initiates a bending moment in the punch, consideration may for example be given to the bending stress in order to check whether the design of the punch satisfies the demand profile. Here, the bending stress is to be understood to mean the stress that acts owing to the bending, that is to say the moment loading. This is defined as:

$$\sigma M = (M/I)*z = M/W$$

where M is the scalar bending moment, I is the geometrical moment of inertia, z is the distance from the cross-sectional center of gravity to the surface layer of the geometrical shape, and W is the section modulus. With the presentation in the form of a stress tensor, for example if one selects the section faces of a body, for example three section faces in each case perpendicular to a direction of a Cartesian coordinate system, the respective acting stress can be checked. Accordingly, for example, three forces in three section faces of the body are obtained in accordance with the following matrix:

$$S = \begin{bmatrix} \sigma_x & \tau_{xy} & \tau_{xz} \\ \tau_{yx} & \sigma_y & \tau_{yz} \\ \tau_{zx} & \tau_{zy} & \sigma_z \end{bmatrix}$$

This consideration in the Cartesian coordinate system is expedient in particular for a region of the punch head which has not yet transitioned into a round, in particular circular shape, but which rather still has a polygonal geometry. In a region of the geometrical shape which, by contrast, is rounded, be it circular or elliptical, the calculation is by contrast preferably based on an orthogonal or cylindrical coordinate system. By means of corresponding transformation, it is then possible to realize transitions from one geometrical shape to another geometrical shape.

It is furthermore possible to perform the design of the geometrical shape by means of tensor calculation. The tensor calculation makes it possible, for example, for the stress state to initially be described independently of a particular coordinate system and, only after the respective calculation method has been derived, for the component equations to be adapted to the geometrical characteristics of the body, for example in cylindrical coordinates or spherical coordinates. The use of a strain tensor, that is to say a second order tensor, which describes the relationship of the instantaneous configuration to the initial configuration during the deformation of continuous bodies and thus the change in the mutual position relationships of the material elements, is preferably supported by virtue of a rate with which the stress is applied also being taken into consideration. The strain rate formed from the derivative of the strain tensor makes it possible in particular to allow for different material behavior. A change in the external shape of the punch in the form of for example expansion, compression, shear or the like can thus be estimated in this way, and the geometry of the punch can be correspondingly adapted until, in the region of the die and in particular in the region of the punch head, bending under pressing force is ruled out. It is also possible here to determine the punch speed with which the punch head preferably moves into the die or is decelerated. For series production, it is therefore important firstly to maintain a predefinable minimum speed and thus cycle time, but secondly to also at the same time find the least possible bending influence.

In a further embodiment, it is provided that the first punch is movable into a second punch, wherein the second punch likewise has an asymmetrical shape between head piece and foot piece. For example, the second punch may likewise be arranged rotationally non-symmetrically with respect to the sintering press axis.

In one embodiment, it is provided that at least the first punch is assembled from different parts. This makes it possible, for example, to use different materials with different moduli of elasticity, and to adapt the distribution and/or arrangement thereof in the punch to a desired bending moment compensation. It is thus also possible to utilize different production methods for different parts of the punch, for example because said production methods, out of principle, permit different degrees of accuracy, and different parts of the punch also require mutually different degrees of accuracy.

According to a further concept of the invention, which may be independent of the abovementioned sintering press or dependent on the abovementioned sintering press, a calculation method for the design of a pressing tool of a sintering press is proposed, preferably for production of metallic green products, wherein, for a first punch of the pressing tool, which has a punch head eccentric and asymmetrical with respect to an axial axis of the sintering press, a degree of bending that occurs during an inflow of force and during an outflow of force during a process of pressing a green product in the sintering press is calculated, and a stiffness of the first punch is adapted thereto through adaptation of an asymmetry of the shape of the first punch between head piece and foot piece, wherein it is checked whether a compensation of an axial tilting moment on the first punch caused by the eccentricity of the punch head has improved as a result of the adaptation of the asymmetry of the shape.

The asymmetry that is to be set can in this case be determined by means of a catalogue of different measures, as have already been described above. It is possible to begin with a basic configuration. Then, in a first design iteration, different measures can be applied and then evaluated against one another. It is furthermore possible to set a specification of measures to be combined with one another. On the basis of this specification, it is then possible by means of a computer-based calculation program for a check to be performed with regard to the compensation of pressing pressure applied by the modeled punch. If it is found here that the model of the punch does not yet exhibit the predefinable results in all ranges, the further adaptation may for example be performed. This may be performed by means of a corresponding algorithm, which can at least be set such that it comprises specifications regarding which measure or measures should be used to perform a further adaptation.

A further embodiment provides that a boundary condition is set according to which the punch reacts, under pressing load, without displacement in a tilting direction. For example, it may be predefinable that the punch remains rigid. It may also be predefinable that said punch exhibits a uniform deflection in an axial direction.

It is preferable if a topology optimization is performed on the first punch, wherein, by means of at least one optimization algorithm, in a predefinable design space, it is checked what omission of material results in a behavior of the punch under pressing force adhering to the predefinable boundary parameters, wherein the design space is set such that it comprises a shape of the first punch which widens from the head piece to the foot piece. The omission of material is preferably preceded or followed by one or more material thickenings. For example, for this purpose, the topology optimization can be departed from, material can be applied by means of CAD, and the topology optimization can be run again.

It is furthermore preferable if the method utilizes a modular system from which different parts of a punch, in each case as a module, can be taken and assembled, wherein the respective module connects different geometries, different materials and different production methods with one another.

According to a further concept of the invention, which may be independent of the abovementioned sintering press and the above method or respectively dependent thereon, a first punch preferably for a sintering press is proposed, wherein the first punch has an asymmetrical shape in a region between head piece and foot piece, having a punch head which is eccentric and asymmetrical with respect to an axial axis of the sintering press. Furthermore, a first punch of said type may have one or more features as have already been described above or will also be described below in conjunction with the sintering press. The first punch and a second punch are preferably movable one inside the other, which second punch likewise has a punch head which is eccentric and asymmetrical with respect to an axial axis of the sintering press.

According to a yet further concept of the invention, which may be independent of one or more of the above concepts or respectively dependent thereon, a method for compressing at least one powder material in a sintering press to form a green product for sintering is proposed, comprising a movement of upper punch and lower punches into a die, comprising a filling of the die with the powder material, and comprising a compression of the powder material, wherein a green product is formed, which green product has a geometry asymmetrical with respect to an axial axis of the sintering press imparted to it by means of a first punch, wherein the first punch has an asymmetrical wall and, during the movement into and out of the die, moves past the latter in a contact-free manner. By means of this process, grinding, in particular lateral friction, during the movement in the die, in particular under the action of a pressing pressure, is avoided. Here, a compensation of an acting bending moment is preferably achieved owing to the asymmetrical loading along the axial axis, owing to the eccentric arrangement of the punch head, owing to the construction of the first punch having the asymmetrical wall. The compensation of the bending moment is thus realized in the punch itself, without flexing, lateral inclination or some other deformation occurring that leads to rubbing of the punch head against an adjacent surface.

Figure 2:
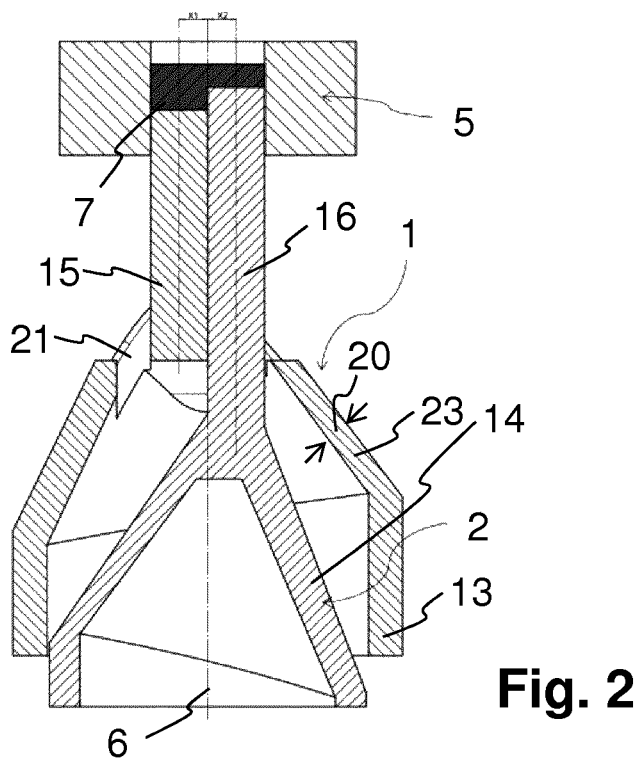
Figure 5:
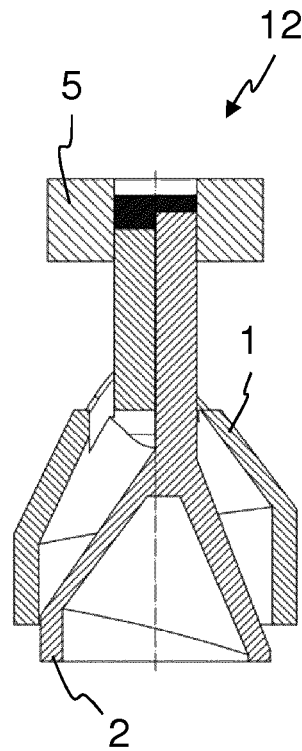
Figure 6:
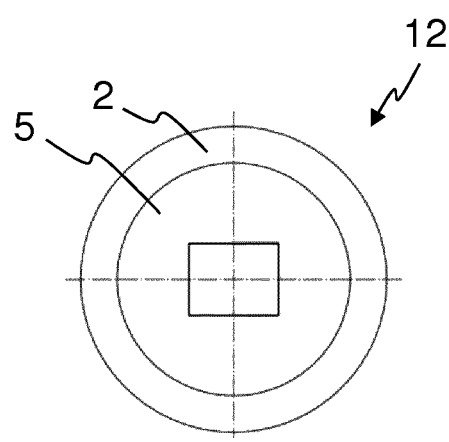
Figure 7:
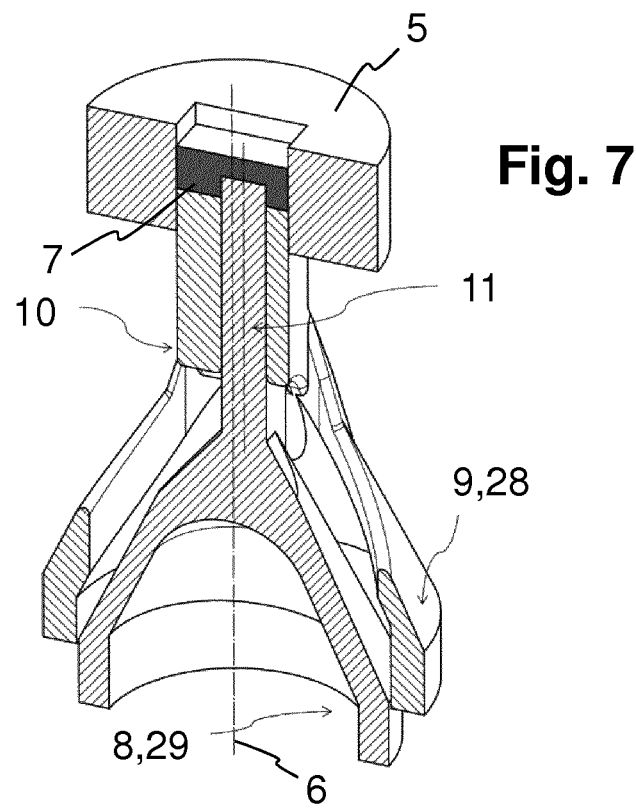
Figure 8:
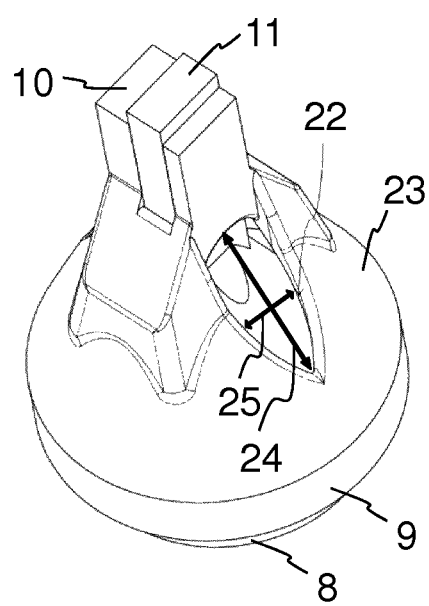
Figure 9:
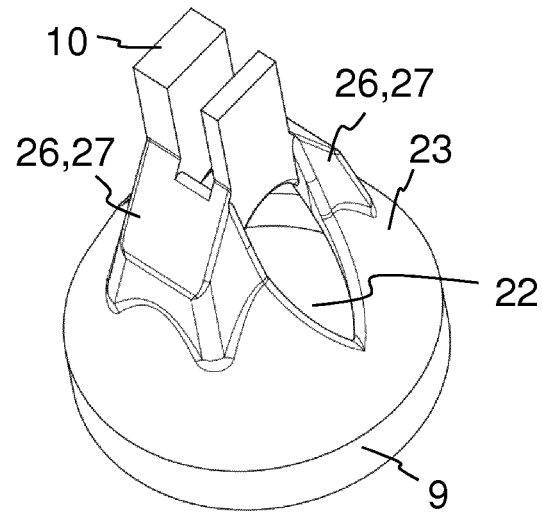

Further advantageous embodiments and refinements will emerge from the following figures, which may be combined with other features of the invention from the description also. Individual features from individual figures are not restricted thereto. Rather, one or more features from one or more figures and also from the description may together form further embodiments. In particular, the figures are to be interpreted not as being restrictive but as being exemplary. The fig. show:

FIG. 1: an oblique view of a detail of a sintering press with two punches, the asymmetrical punch heads of which are movable in a die, FIG. 2: shows a cross section through the sintering press from FIG. 1, FIGS. 3 to 6: the sintering press from FIGS. 1 and 2 comparatively in different illustrations, FIG. 7: an oblique view of a detail of a further embodiment of a sintering press with two punches, in the case of which bending moments can be compensated by means of the design of the punches, FIG. 8: an oblique view of the two punches from FIG. 7, and FIG. 9: an oblique view of one of the two punches from FIG. 7 and FIG. 8.

FIG. 1 shows, in an oblique view, a detail of its sintering press 12 with two punches (a first punch 1 and a second punch 2), the punch heads (first punch head 3 and second punch head 4) of which are movable in a die 5. By means of this movement of the punch heads 3, 4, a green product 7 can be formed from powder in the die 5. The die 5 has a die outer wall 30, within which the green product 7 can be formed, wherein the respective punch head 3, 4 can act on a face surface 35 of the green product 7. The two punch heads 3, 4 are each individually designed asymmetrically with respect to an axial axis 6 of the sintering press 12 and arranged eccentrically with respect to the axial axis 6. In this embodiment, the first punch 1 constitutes an upper punch 28 and the second punch 2 constitutes a lower punch 29. The first punch 1 is movable along a first movement axis 33, and the second punch 2 is movable along a second movement axis 34.

Also schematically shown is a powder store 31 for the filling of the die 5 of the sintering press 12 with a sinterable powder material 32 from which the green product 7 can be formed. The green product 7, which in the exemplary embodiment shown has a shape which is rotationally non-symmetrical with respect to the axial axis 6, can, after the action of the pressing force by means of the punches 1, 2, be relieved of load such that crack formation in the green product 7 is prevented. Therefore, the respective geometry of the first punch 1 and of the second punch 2 is preferably designed such that not only internal compensation of a bending moment is possible. Rather, both punches 1, 2 are preferably designed such that the elastic behavior thereof during the relief of load of the pressing force is the same. During the relief of load of both punches 1, 2, it is thus possible for the green product 7 to be uniformly relieved of load over the entire face surface 35 of the green product 7. This can prevent the occurrence of non-uniform stresses and thus of possibly non-uniformly distributed shear forces, which can lead to shearing in the material of the green product 7 and thus to crack formation in the green product 7. In this regard, reference is also made to the prior art already cited above, and to the possibilities, described further above, arising from the design of the punches 1, 2.

The first punch 1 is movable in the second punch 2. Both punches 1, 2 have in each case one conical section (first conical section 13 and second conical section 14) at a respective punch foot (first punch foot 17 and second punch foot 18) and a straight section (first straight section 15 and second straight section 16) at the respective punch head 3, 4. The above-described asymmetry is realized through the presence of the conical sections 13, 14 and the straight sections 15, 16. Said asymmetry is formed by a combination of cylindrical ring shape and conical ring shape. Here, the cylindrical ring shape is realized by means of the straight sections 15, 16. The conical ring shape is realized here by means of the conical sections 13, 14. A transition exists between conical sections 13, 14 and straight sections 15, 16. By means of this design, the respective punch 1, 2 narrows from the respective punch foot 17, 18 toward the respective punch head 3, 4. The term "punch foot" 17, 18 is used here synonymously for the expression "foot piece" which is also used above, and the term "punch head" 3, 4 is used synonymously with the expression "head piece" which is also used above. By means of this geometry of the punches 1, 2, compensation of a bending moment can be realized. This can be contributed to for example by means of a different wall thickness, wall openings and/or oblique transitions between the respective straight section 15, 16 and the respective conical section 13, 14 of the respective punch 1, 2.

The geometries of the punches 1, 2 differ from one another, in particular both with regard to the respective straight section 15, 16 and with regard to the respective conical section 13, 14. This may be advantageous owing to differently acting forces and owing to different dimensions of the punches 1, 2.

A spread angle 19 (that is to say a cone opening angle) of the respective conical section 13, 14 may also be of different magnitude in the case of the two punches 1, 2. For the sake of clarity, the spread angle 19 is shown only for the second punch 2. In an end position, the respective punch feet 17, 18 are preferably situated on different planes.

Such punches are preferably used in sintering presses such as emerge from the applicant's application DE 10 2014 201 966 with the title "Pulverpresse mit kegeligem Unterbau" ["Powder press having a cone-shaped substructure"], which has not yet been published, and the entire content of which is hereby incorporated by reference into the disclosure in this regard.

FIG. 2 shows a cross section through the sintering press 12 from FIG. 1, in particular through the two punches 1, 2 and the die 5. Here, it is possible to particularly clearly see the design of the transition between the respective conical sections 13, 14 and the respective straight sections 15, 16 of the two punches 1, 2. The conical sections 13, 14 each have a wall thickness 20 of a wall 23 which differs at different locations of the conical sections 13, 14. Furthermore, a wall opening 21 is shown. FIG. 2 shows the asymmetry of the punches 1, 2 with respect to the axial axis 6 more clearly than FIG. 1.

Figure 3:
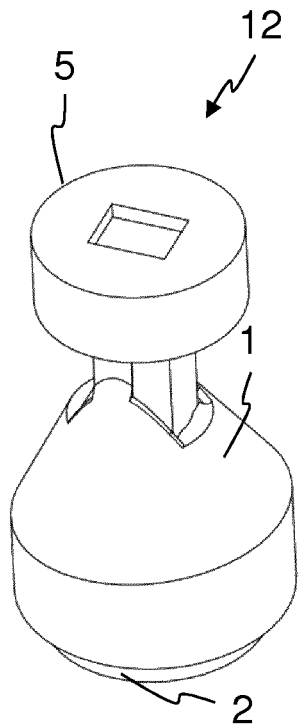
Figure 4:
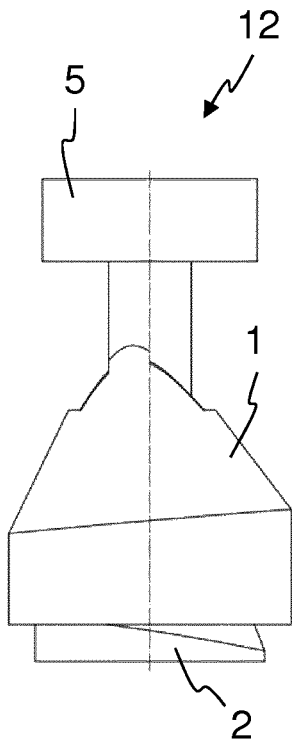

FIGS. 3 to 6 show the sintering press 12 from FIGS. 1 and 2 comparatively in different illustrations. FIG. 3 shows a perspective view from the outside, FIG. 4 shows a side view from the outside, FIG. 5 shows a cross-sectional view from the same perspective as that illustrated in FIG. 4, and FIG. 6 shows a plan view from the outside. With regard to the reference designations used, reference is made to the above description of FIGS. 1 and 2.

FIG. 7 shows a perspective sectional illustration of a further embodiment of a sintering press 12 which has two punches (an inner punch 8 and an outer punch 9) which are movable in a die 5. In this embodiment, the outer punch 9 constitutes an upper punch 28 and the inner punch 8 constitutes a lower punch 29. The two punch heads 10, 11 are each individually designed asymmetrically with respect to an axial axis 6 of the sintering press 12 and arranged eccentrically with respect to the axial axis 6.

A green product 7 can be formed from powder in the die 5. The two punches 8, 9 are designed such that a bending moment that can act on the respective punch 8, 9 can be compensated. The inner punch 8 has an inner punch head 11 which is movable within an outer punch head 10 of the outer punch 9. The outer punch head 10 of the outer punch 9 in this case surrounds the inner punch head 11, which is illustrated in the cross-sectional illustration as a surrounding configuration from two sides. In this case, too, the term "punch head" 10, 11 is used synonymously with the expression "head piece" which is also used above. By means of the arrangement shown, a bending tendency of the two punches 8, 9 can be reduced. Friction between the punches 8, 9 and also with the die 5 can thus be reduced, in particular even eliminated entirely.

FIG. 8 shows a part of the sintering press 12 from FIG. 7 in an oblique view from the outside. It is possible to see the inner punch 8 with the inner punch head 11 and the outer punch 9 with the outer punch head 10. The outer punch 9 has a material cutout 22 which is realized as an aperture through a wall 23 of the outer punch 9. The material cutout 22 constitutes one of the material openings described further above, by means of which the asymmetry of the respective punch 8, 9 can be realized. The material cutout 22 serves in particular (as is likewise described further above) for realizing an asymmetry in the respective punch 8, 9. The material cutout 22 or the asymmetry possibly furthermore serves for realizing a bending compensation means, whereby, for example, bending of the respective punch head 10, 11 or of the respective punch 8, 9 in one direction is counteracted. The material cutout 22 has a longitudinal extent 24 which is greater than a circumferential extent 25.

FIG. 9 shows an oblique view of the outer punch 9 from FIG. 7 and FIG. 8, wherein the inner punch 8 is not shown in this illustration. The outer punch 9 has thickened portions 26 of the wall 23, in particular in the form of reinforcements 27. Furthermore, the outer punch 9 has material cutouts 22 (one of which is shown) in the wall 23. The thickened portions 26 and the material cutouts 22 can contribute to reducing a bending tendency of the outer punch 9.

LIST OF REFERENCE DESIGNATIONS

1 First punch
2 Second punch
3 First punch head
4 Second punch head
5 Die
6 Axial axis
7 Green product
8 Inner punch
9 Outer punch
10 Outer punch head
11 Inner punch head
12 Sintering press
13 First conical section
14 Second conical section
15 First straight section
16 Second straight section
17 First punch foot
18 Second punch foot
19 Spread angle
20 Wall thickness
21 Wall opening
22 Material cutout
23 Wall
24 Longitudinal extent
25 Circumferential extent
26 Thickened portion
27 Reinforcement
28 Upper punch
29 Lower punch
30 Die outer wall
31 Powder store
32 Powder material
33 First movement axis
34 Second movement axis
35 Face surface

The invention claimed is:

1. A sintering press comprising at least one upper punch and at least one lower punch, a powder store for the filling of a die of the sintering press with a sinterable powder material, and a die for the production of a green product from the sinterable powder material from the powder store, wherein a first punch of the at least one upper punch and/or the at least one lower punch has a punch head which is eccentric and asymmetrical with respect to a central axis along a pressing direction of the sintering press such that a central axis of the punch head is offset from the central axis along the pressing direction of the sintering press, which punch head is, without a guide, movable within the die along a die outer wall and/or along an adjacent punch in the die wherein the first punch has, between the punch head and a punch foot, an asymmetrical shape which inhibits axial tilting of the punch and grinding of the punch head along an adjacent outer surface in the die during the movement into and the movement out of said die during a pressing process during the production of the green product wherein the asymmetrical shape of the first punch includes a conical section having a conical ring shape and a straight section having a cylindrical ring shape.

2. The sintering press as claimed in claim 1, wherein along a cross section of the first punch perpendicular to a movement axis thereof, the asymmetrical shape has an asymmetrical wall with thicknesses of the asymmetrical wall that differ at different locations about the movement axis.

3. The sintering press as claimed in claim 1, wherein the first punch and a second punch are movable one inside the other, wherein the second punch likewise has an asymmetrical shape between a punch head of the second punch and a foot piece of the second punch.

4. The sintering press as claimed in claim 1, wherein the first punch is assembled from different parts.

5. A first punch for a sintering press as claimed in claim 1, wherein the punch has an asymmetrical shape in a region between a punch head and a punch foot, in which the punch head is eccentric and asymmetrical with respect to the central axis along the pressing direction of the sintering press, wherein the asymmetrical shape of the punch includes a conical section having a conical ring shape and a straight section having a cylindrical ring shape.

6. The sintering press of claim 1, wherein the first punch includes an oblique transition between the conical section and the straight section.

7. The sintering press of claim 1, wherein the asymmetrical shape between the punch head and a punch foot is realized by material openings extending through a wall of the first punch.

8. The sintering press of claim 1, wherein the punch foot of the first punch is symmetrical about the central axis along the pressing direction of the sintering press, but the punch head is asymmetrical about the central axis along the pressing direction of the sintering press.

9. The sintering press as claimed in claim 2, wherein the asymmetrical wall is a wall equipped with strut arrangements.

10. The sintering press of claim 6, wherein the oblique transition between the conical section and the straight section has a narrowing oviform or non-circular elliptical ring shape.

11. The sintering press of claim 6, wherein the oblique transition from the conical section and the straight section runs along a circumference obliquely situated in relation to the central axis along the pressing direction of the sintering press.

12. A method for compressing the sinterable powder material in the sintering press of claim 1 to form the green product for sintering, the method comprising:
moving the at least one upper punch and the at least one lower punch into the die;
filling the die with the sinterable powder material; and compressing the sinterable powder material, wherein the green product is formed, the green product having a geometry asymmetrical with respect to the central axis along the pressing direction of the sintering press imparted to the green product by the first punch, wherein the first punch has an asymmetrical wall and, during a movement into and out of the die, the first punch moves past the die in a radially load-free, contact-free manner.

* * * * *